United States Patent
Mawatari et al.

(10) Patent No.: US 7,553,899 B2
(45) Date of Patent: Jun. 30, 2009

(54) FLAME RETARDANT RESIN COMPOSITION AND MOLDED ARTICLE

(75) Inventors: Masaaki Mawatari, Tokyo (JP); Sung-Ho Lee, Seoul (KR); Young-Ho Choi, Seoul (KR)

(73) Assignees: Techno Polymer Co., Ltd., Tokyo (JP); LG Chem, Ltd., Seoul (KR)

( * ) Notice: Subject to any disclaimer, the term of this patent is extended or adjusted under 35 U.S.C. 154(b) by 288 days.

(21) Appl. No.: 11/628,536

(22) PCT Filed: Jun. 3, 2005

(86) PCT No.: PCT/JP2005/010233
§ 371 (c)(1),
(2), (4) Date: Jan. 4, 2007

(87) PCT Pub. No.: WO2005/121243
PCT Pub. Date: Dec. 22, 2005

(65) Prior Publication Data
US 2007/0208114 A1   Sep. 6, 2007

(30) Foreign Application Priority Data
Jun. 8, 2004   (JP)   ............................. 2004-170470

(51) Int. Cl.
*C08K 3/34* (2006.01)
*C08K 3/04* (2006.01)
(52) U.S. Cl. ........................ 524/445; 524/100; 524/156; 524/405; 525/100; 525/105; 525/106
(58) Field of Classification Search ................. 524/445, 524/100, 156, 405; 525/100, 105, 106
See application file for complete search history.

(56) References Cited

U.S. PATENT DOCUMENTS 6,410,122 B1   6/2002   Tono et al.
7,074,854 B2   7/2006   Eichenauer et al.
2003/0036586 A1   2/2003   Eichenauer et al.

FOREIGN PATENT DOCUMENTS

| JP | 08-81583 A | 3/1996 |
| JP | 08-325408 A | 12/1996 |
| JP | 2000-001926 A | 1/2000 |
| JP | 2000-127297 A | 5/2000 |
| JP | 2001-55515 A | 2/2001 |
| JP | 2002-105328 A | 4/2002 |
| JP | 2002-114914 A | 4/2002 |
| JP | 2002-129022 A | 5/2002 |
| WO | WO 98/31730 A1 | 7/1998 |
| WO | 01/62850 A1 | 8/2001 |
| WO | WO 03/066956 A1 | 8/2003 |

*Primary Examiner*—Peter Szekely
(74) *Attorney, Agent, or Firm*—Fitch, Even, Tabin & Flanner

(57) ABSTRACT

The present invention provides a flame retardant resin composition comprising the following component (A), component (B), component (C) and component (D), in which 0.1 to 50 parts by mass of the component (B), 0.001 to 30 parts by mass of the component (C) and 0.1 to 50 parts by mass of the component (D) are blended with 100 parts by mass of the component (A).

Component (A): A rubber-modified styrene resin obtained by (co)polymerizing an aromatic vinyl compound or an aromatic vinyl compound and another vinyl monomer copolymerizable with the aromatic vinyl compound in a presence of a rubber-like polymer;

Component (B): A thermally expandable graphite;

Component (C): A layered clay material modified by a water-soluble polymer; and

Component (D): At least one selected from the group consisting of silicone compounds, boron oxides, aminotriazine sulfate compounds and aminotriazine compounds. The resin composition is excellent in flame retardance and impact resistance.

7 Claims, No Drawings

US 7,553,899 B2

FLAME RETARDANT RESIN COMPOSITION AND MOLDED ARTICLE

This Application is the National Phase of International Application No. PCT/JP2005/010233 filed Jun. 3, 2005, which designated the U.S. and was not published under PCT Article 21(2) in English, and this application claims, via the aforesaid International Application, the foreign priority benefit of and claims the priority from Japanese Application No. 2004-170470, filed Jun. 8, 2004, the complete disclosures of which are incorporated herein by reference.

TECHNICAL FIELD

The present invention relates to a flame retardant resin composition which provides molded articles excellent in flame retardance and impact resistance, and also relates to a molded article which is formed by use of the flame retardant resin composition as a molding material.

BACKGROUND ART

Flame retardant resin compositions derived from flame-retardation of rubber-reinforced styrene resins such as ABS resins and HIPS (high impact polystyrene) and compositions of these resins with a polycarbonate resin are excellent in mechanical properties, physical properties, electric properties, etc., and thus they are widely used in the fields of electrics and electronics, vehicles, sanitation, and the like.

For flame-retardation of such resins, flame retardants represented by halogen-based flame retardants (e.g., see Japanese Patent No. 3198485), organophosphorus-based flame retardants (e.g., see Japanese Patent Laid-Open (Kokai) Hei. No. 9-87337 and Japanese Patent Laid-Open (Kokai) Hei. No. 10-120853), and the like are used.

When a halogen-based flame retardant is used in the above flame retardant resin composition, a problem occurs such that it causes metal corrosion or the like of processing machines. When a phosphorus-based flame retardant such as a phosphate compound is used, a problem occurs such that the flame retardant acts as a plasticizer of the resin, and thus makes mechanical strength, thermal resistance and the like deteriorated.

Further, Japanese Patent Publication (Kokoku) Sho. No. 57-1547 discloses a technique in which a composite metal hydroxide is blended in a styrene resin. However, as is clear from working examples thereof, it does not provide a sufficient improvement of flame resistance whilst it requires a large blending amount. Also, it requires inorganic substances to be blended in a large amount, the obtained composition is inferior in impact resistance and fluidity. Further, Japanese Patent Laid-Open (Kokai) Sho. No. 61-291642 discloses a method in which a phosphorus compound and a novolac resin are blended in an ABS resin, but it causes problems of low impact resistance, yellowing and the like.

Patent Document 1: Japanese Patent No. 3198485 specification.

Patent Document 2: Japanese Patent Laid-Open (Kokai) Hei. No. 9-87337.

Patent Document 3: Japanese Patent Laid-Open (Kokai) Hei. No. 10-120853.

Patent Document 4: Japanese Patent Publication (Kokoku) Sho. No. 57-1547.

Patent Document 5: Japanese Patent Laid-Open (Kokai) Sho. No. 61-291642.

DISCLOSURE OF THE INVENTION

Problems that is to be Solved by the Invention

An object of the present invention is to provide a flame retardant resin composition excellent in flame retardance and impact resistance. Another object of the present invention is to provide a molded article composed of the flame retardant resin composition.

Means that Solve the Problems

As a result of extensive studies to achieve the above objects, the present inventor has found that a flame retardant resin composition which provides molded articles excellent in flame retardance and impact resistance is obtained by blending a thermally expandable graphite, a layered clay material modified by a water-soluble polymer, and at least one selected from the group consisting of silicone compounds, boron oxides, aminotriazine sulfate compounds and aminotriazine compounds in predetermined amounts with a styrene resin such as an ABS resin, or a mixture of a styrene resin and another resin such as a polycarbonate resin, and has accomplished the present invention.

Specifically, the present invention provides a flame retardant resin composition comprising the following component (A), component (B), component (C) and component (D), characterized in that 0.1 to 50 parts by mass of the component (B), 0.001 to 30 parts by mass of the component (C) and 0.1 to 50 parts by mass of the component (D) are blended with 100 parts by mass of the component (A).

(A) A rubber-modified styrene resin obtained by (co)polymerizing an aromatic vinyl compound or an aromatic vinyl compound and another vinyl monomer copolymerizable with the aromatic vinyl compound in a presence of a rubber-like polymer, (B) A thermally expandable graphite, (C) A layered clay material modified by a water-soluble polymer, and (D) At least one selected from the group consisting of silicone compounds, boron oxides, aminotriazine sulfate compounds and aminotriazine compounds.

According to another aspect of the present invention, a molded article composed of the above-mentioned flame retardant resin composition of the present invention is provided.

EFFECTS OF THE INVENTION

Since the flame retardant resin composition of the present invention is constituted by blending (B) a thermally expandable graphite in a specified amount, (C) a layered clay material modified by a water-soluble polymer in a specified amount and (D) a silicone compound, a boron oxide, an aminotriazine sulfate compound or an aminotriazine compound in a specified amount with (A) a rubber-modified styrene resin, molded articles excellent in flame retardance and impact resistance can be obtained.

BEST MODE FOR CARRYING OUT THE INVENTION

Hereinafter, the present invention will be described in detail.

The rubber-modified styrene resin, which is the component (A) of the present invention, may be constituted of the following component (A-i), or may be a so-called graft-blend type rubber-modified styrene resin obtained by blending a (co)polymer of the following component (A-ii) with the following component (A-i).

Component (A-i): A rubber-modified styrene resin obtained by (co)polymerizing a monomer (b) composed of an aromatic vinyl compound or an aromatic vinyl compound and another vinyl monomer copolymerizable with the aromatic vinyl compound in a presence of a rubber-like polymer (a).

Component (A-ii): A (co)polymer obtained by (co)polymerizing a vinyl monomer (b') in the absence of the rubber-like polymer (a).

Each of the above-mentioned component (A-i) and (A-ii) may be used singly or in a combination of two or more.

From the viewpoint of flame retardance and impact resistance, which are contemplated by the present invention, the content of the rubber-like polymer (a) in the component (A) is preferably in the range of 3 to 80% by mass, further preferably 5 to 50% by mass, especially preferably 10 to 30% by mass based on 100% by mass of the component (A) in total.

In the present specification, "(co)polymerization" means homopolymerization and/or copolymerization; and "(meth) acryl" means acryl and/or methacryl.

The above-mentioned rubber-like polymer (a) is not specifically limited, but specific examples thereof includes butadiene-based (co)polymers such as polybutadienes, butadiene-styrene copolymers, butadiene-acrylonitrile copolymers, butadiene-(meth)acrylate copolymers, styrene-butadiene block copolymers and styrene-isoprene block copolymers, partially or completely hydrogenated products of these butadiene-based (co)polymers, ethylene-propylene copolymers, ethylene-propylene-nonconjugated diene copolymers, ethylene-butene-1 copolymers, ethylene-butene-1-nonconjugated diene copolymers, acrylic rubbers, silicone rubbers, and silicone-acrylic IPN rubbers. These may be used singly or in a combination of two or more. Among these, polybutadienes, butadiene-styrene copolymers, styrene-butadiene block copolymers and hydrogenated products thereof, ethylene-propylene copolymers, ethylene-propylene-nonconjugated diene copolymers, acrylic rubbers and silicone rubbers are preferable.

Gel content of the above-mentioned rubber-like polymer is not specifically limited, but when the component (A-i) is obtained by emulsion polymerization, the gel content is preferably not more than 98% by mass, further preferably 40 to 98% by mass, especially preferably 50 to 95% by mass. In this range, a flame retardant resin composition capable of providing a molded article excellent especially in flame retardance and impact resistance can be obtained.

The above-mentioned gel content is determined by a method shown as follows. One (1) gram of a rubber-like polymer is added to 100 ml of toluene. The mixture is allowed to stand at room temperature for 48 hours, and thereafter filtered through a 100-mesh metal screen (the mass is defined as $W_1$). The filtrated insoluble matter in toluene and the metal screen are vacuum-dried at 80° C. for 6 hours and weighed (the mass is defined as $W_2$). The gel content is calculated by the following equation (1).

$$\text{Gel content (\% by mass)} = [\{W_2(g) - W_1(g)\}/1(g)] \times 100 \quad (1)$$

The gel content can be adjusted by suitably setting type and amount of a molecular-weight adjusting agent, polymerization time, polymerization temperature, polymerization conversion, etc. when the rubber-like polymer is produced.

An aromatic vinyl compound constituting the above-mentioned monomer (b) includes styrene, α-methylstyrene, hydroxystyrene and the like. These may be used singly or in combination of two or more. Among these, styrene and α-methylstyrene are preferable.

Another monomer copolymerizable with the aromatic vinyl compound includes vinyl cyanide compounds, (meth) acrylate compounds, maleimide compounds and various other kinds of functional group-containing unsaturated compounds. The vinyl monomer (b) preferably comprises an aromatic vinyl compound as an essential monomer component, and optionally comprises one or more selected from the group consisting of vinyl cyanide compounds, (meth)acrylate compounds and maleimide compounds as an additional monomer component, and may further optionally comprises at least one of various other functional group-containing unsaturated compounds as an additional monomer component. The various other functional group-containing unsaturated compounds include unsaturated acid compounds, epoxy group-containing unsaturated compounds, hydroxy group-containing unsaturated compounds, oxazoline group-containing unsaturated compounds, acid anhydride group-containing unsaturated compounds, substituted or unsubstituted amino group-containing unsaturated compounds, and the like. These functional group-containing unsaturated compounds may be used singly or in combination of two or more.

The vinyl cyanide compound includes acrylonitrile, methacrylonitrile and the like. These may be used singly or in combination of two or more. The vinyl cyanide compound imparts chemicals resistance. When a vinyl cyanide compound is used, it is used in an amount of preferably 1 to 60% by mass, and further preferably 5 to 50% by mass of the component (b).

The (meth)acrylate compound includes methyl acrylate, ethyl acrylate, butyl acrylate, methyl methacrylate, ethyl methacrylate, butyl methacrylate and the like. They may be used singly or in combination of two or more. Among these, methyl methacrylate is preferable. Use of a (meth)acrylate compound is preferably because it imparts transparency or transparent feeling. When a (meth)acrylate compound is used, it is used in an amount of preferably 1 to 80% by mass, and further preferably 5 to 80% by mass of the component (b).

The maleimide compound includes maleimide, N-phenylmaleimide, N-cyclohexylmaleimide and the like. They may be used singly or in combination of two or more. The maleimide unit may be introduced by a method in which maleic anhydride is copolymerized and then imidized. The maleimide compound imparts thermal resistance. When a maleimide compound is used, it is used in an amount of preferably 1 to 60% by mass, further preferably 5 to 50% by mass of the component (b).

The unsaturated acid compound includes acrylic acid, methacrylic acid, ethacrylic acid, maleic acid, fumaric acid, itaconic acid, crotonic acid, cinnamic acid and the like. They may be used singly or in combination of two or more.

The epoxy group-containing unsaturated compound includes glycidyl acrylate, glycidyl methacrylate, acyl glycidyl ether and the like. They may be used singly or in combination of two or more.

The hydroxy group-containing unsaturated compound includes 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl methacrylate, 2-hydroxyethyl acrylate, N-(4-hydroxyphenyl)maleimide and the like They may be used singly or in combination of two or more.

The oxazoline group-containing unsaturated compound includes vinyloxazoline and the like They may be used singly or in combination of two or more.

The acid anhydride group-containing unsaturated compound includes maleic anhydride, itaconic anhydride, citraconic anhydride and the like They may be used singly or in combination of two or more.

The substituted or unsubstituted amino group-containing unsaturated compound includes aminoethyl acrylate, propylaminoethyl acrylate, dimethylaminoethyl methacrylate, aminoethyl methacrylate, N-vinyldiethylamine, N-acetylvinylamine, acrylamine, methacrylamine, N-methylacrylamine, acrylamide, N-methylacrylamide, p-aminostyrene and the like. They may be used singly or in combination of two or more.

When the above-mentioned various other functional group-containing unsaturated compounds are used in a blend of a rubber-modified styrene resin and another polymer, compatibility between them can be improved. A monomer preferable for achieving such an effect is epoxy group-containing unsaturated compounds, carboxyl group-containing unsaturated compounds and hydroxy group-containing unsaturated compounds; further preferable are hydroxy group-containing unsaturated compounds; and especially preferable is 2-hydroxyethyl(meth)acrylate.

The addition amount of the above-mentioned various other functional group-containing unsaturated compounds in terms of the total amount of the functional group-containing unsaturated compounds used in a rubber-modified styrene resin is preferably 0.1 to 20% by mass, and further preferably of 0.1 to 10% by mass based on the rubber-modified styrene resin in total.

The amount of the above-mentioned other vinyl monomer copolymerizable with an aromatic vinyl compound is preferably not more than 80% by mass, and further preferably not more than 70% by mass based on 100% by mass of the monomers (b) in total. Preferable combinations of monomers are styrene, styrene/acrylonitrile, styrene/methyl methacrylate, styrene/acrylonitrile/methyl methacrylate, α-methylstyrene/acrylonitrile, styrene/acrylonitrile/glycidyl methacrylate, styrene/acrylonitrile/(meth)acrylate, styrene/acrylonitrile/2-hydroxyethyl methacrylate, styrene/α-methylstyrene/acrylonitrile, etc., and may be used singly or in combination of two or more.

The component (A-i) can be manufactured by a known polymerization method, for example, emulsion polymerization, bulk polymerization, solution polymerization and suspension polymerization, and a combination thereof.

When production is carried out by emulsion polymerization, a polymerization initiator, a chain transfer agent, an emulsifier, etc. are used, which may be selected from all of the known agents.

The polymerization initiator includes cumene hydroperoxide, p-menthane hydroperoxide, diisopropylbenzene hydroperoxide, tetramethylbutyl hydroperoxide, tert-butyl hydroperoxide, potassium persulfate, azobisisobutyronitrile and the like. As a polymerization initiation aid, redox systems such as various kinds of reducing agents, a sugar-containing iron pyrophosphate formulation and a sulfoxylate prescription are preferably used.

The chain transfer agent includes octylmercaptane, n-dodecylmercaptane, tert-dodecylmercaptane, terpinolene and the like.

As the emulsifier, an alkylbenzenesulfonate such as sodium dodecylbenzenesulfonate, an aliphatic sulfonate such as sodium laurylsulfate, a potassium or sodium salt of a higher fatty acid having 10 to 20 carbon atoms, and a potassium or sodium salt of a rosin acid can be used.

Referring to the manner of using a rubber-like polymer (a) and a monomer (b) in emulsion polymerization, the monomer (b) may be entirely added and polymerized in the presence of the whole amount of the rubber-like polymer (a), or may be dividedly or continuously added and polymerized. Further, part of the rubber-like polymer (a) may be added in the course of polymerization.

After the emulsion polymerization, the obtained latex is coagulated with a common coagulant, washed with water and dried to give a component (A-i) of the present invention as powder. Here, latexes of two or more components (A-i) obtained by emulsion polymerization may suitably be blended, and then coagulated. As a coagulant used here, an inorganic salt such as calcium chloride, magnesium sulfate and magnesium chloride, or an acid such as sulfuric acid, hydrochloric acid, acetic acid and citric acid can be used.

When a component (A-i) is produced by solution polymerization, a usable solvent is an inactive polymerization solvent used in common radical polymerizations, and includes, for example, an aromatic hydrocarbon such as ethylbenzene and toluene, a ketone such as methyl ethyl ketone and acetone, acetonitrile, dimethylformamide and N-methylpyrrolidone. Polymerization temperature is preferably in the range of 80 to 140° C., and further preferably 85 to 120° C.

On polymerization, a polymerization initiator may be used, or polymerization may be performed by thermal polymerization without using a polymerization initiator. As the polymerization initiator, preferably used are organic peroxides and the like including ketone peroxide, dialkyl peroxide, diacyl peroxide, peroxy ester, hydroperoxide, azobisisobutyronitrile, benzoyl peroxide and the like.

When a chain transfer agent is used, for example, mercaptanes, α-methylstyrene dimmers, terpinolenes and the like are usable.

When the component (A-i) is produced by bulk polymerization or suspension polymerization, the polymerization initiators, chain transfer agents and the like described in the solution polymerization can be used.

Here, polymer components obtained by polymerizing a monomer (b) in the presence of a rubber-like polymer (a) generally contain a copolymer in which the monomer (b) is graft-copolymerized to the rubber-like polymer (a) and a nongrafted component ((co)polymer of the monomers (b) themselves) which is not grafted to the rubber-like polymer.

The amount of the monomers remaining in the component (A-i) obtained by the above-mentioned polymerization methods is preferably not more than 10,000 ppm, and further preferably not more than 5,000 ppm.

Graft ratio of the above-mentioned (A-i) is preferably 20 to 200% by mass, further preferably 30 to 150% by mass, and especially preferably 40 to 120% by mass. The graft ratio (%) can be obtained by the following equation.

$$\text{Graft ratio (\% by mass)} = \{(T-S)/S\} \times 100 \qquad (2)$$

In the above equation (2), T represents a mass (g) of insoluble matter obtained by adding 1 g of a component (A-i) in 20 ml of acetone (but acetonitrile, in the case of using an acrylic rubber as the rubber-like polymer (a)), shaking the mixture for 2 hours in a shaker, centrifuging the mixture for 60 min by a centrifuge (at a rotation speed of 23,000 rpm), thereby separating the insoluble matter from soluble matter; and S represents a mass (g) of the rubber-like polymer contained in 1 g of the component (A).

Limiting viscosity [η] (measured using methyl ethyl ketone as the solvent at 30° C.) of the soluble matter in acetone (but acetonitrile, in the case of using an acrylic rubber as the rubber-like polymer (a)) of the component (A-i) relevant to the present invention is preferably 0.2 to 1.2 dl/g, further preferably 0.2 to 1 dl/g, and especially preferably 0.3 to 0.8 dl/g.

Average particle size of the grafted rubber-like polymer dispersed in the component (A-i) relevant to the present invention is preferably in the range of 500 to 30,000 Å, further preferably 1,000 to 20,000 Å, and especially preferably 1,500 to 8,000 Å. The average particle size can be measured by a known method using an electron microscope.

As the vinyl monomer (b') constituting the (co)polymer of the component (A-ii), aromatic vinyl compounds, vinyl cyanide compounds, (meth)acrylate compounds, maleimide compounds, unsaturated acid compounds, epoxy group-containing unsaturated compounds, hydroxy group-containing unsaturated compounds, oxazoline group-containing unsaturated compounds, acid anhydride group-containing unsaturated compounds and substituted or unsubstituted amino group-containing unsaturated compounds, which have been enumerated as the above-mentioned vinyl monomers (b), are all usable. These compounds may be used singly or in combination of two or more. The component (A-ii) may be a (co)polymer of a single composition, or a blend of two or more (co)polymers of different compositions.

Particularly, the vinyl monomer (b') comprises an aromatic vinyl compound as an essential monomer component, and preferably comprises as an additional monomer component at least one selected from the group consisting of vinyl cyanide compounds, (meth)acrylate compounds, maleimide compounds and hydroxy group-containing unsaturated compounds as required. The preferable examples and preferable addition amount described above concerning these compounds in relation to the vinyl monomer (b) are also applied to the vinyl monomer (b') as they are.

The component (A-ii) can be produced by the same methods as the above-mentioned component (A-i), except that polymerization of the above-mentioned vinyl monomer (b') is performed in the absence of the rubber-like polymer.

Limiting viscosity [η] (measured using methyl ethyl ketone as the solvent at 30° C.) of the component (A-ii) is preferably 0.2 to 1.2 dl/g, further preferably 0.2 to 1 dl/g, and especially preferably 0.3 to 0.8 dl/g. The limiting viscosity can be controlled by a chain transfer agent, polymerization time, polymerization temperature and the like.

The component (A-ii) can be mixed with the above-mentioned component (A-i) by a suitable method.

As a raw material graphite used for a thermally expandable graphite of the component (B) of the present invention, natural graphite, thermally decomposed graphite, kish graphite, etc. are available. These graphites have a structure in which hexagonal mesh-like planes formed by carbon atoms are layered with each other. It is known that, in the layered structure, the bond within the layer plane is very strong, but the bond between the layer planes is weak; relatively broad spaces remain between the layers; and under an appropriate condition, other kinds of compounds can intrude into between the graphite layers and make a graphite intercalation compound, and it is further known that certain kinds of the graphite intercalation compound elongate in the C axis direction by rapid heating.

The thermally expandable graphite used in the present invention is the above-mentioned graphite intercalation compound, and includes, for example, materials listed below:

(i) Various inorganic acid salts of graphite obtained by cathodic oxidation of graphite or by making graphite exist together with sulfuric acid under an oxidizing condition in the presence of nitric acid, chromic acid, potassium permanganate, manganese dioxide, hydrogen peroxide, etc., such as graphite bisulfate;

(ii) Various metallic graphites, such as sodium graphite ($C_{64}Na$) and potassium graphite ($C_8K$, $C_{24}K$, $C_{36}K$), obtained by making a graphite and an alkaline metal or alkaline earth metal in a molten state;

(iii) Various halogenated graphites, such as chlorinated graphite ($C_8Cl$) and brominated graphite ($C_8Br$), obtained by making a graphite and a halogen or halogen compound react at a temperature of not less than room temperature; and (iv) Metal halide-graphite compounds, such as aluminum chloride-graphite compound or ferric chloride-graphite compound, obtained by reacting a graphite with a metal halide at a temperature of not less than room temperature.

Especially preferable is the above (i).

The thermally expandable graphite of the above (i) can be manufactured, for example, by making a raw material graphite contact with a mixture of 98% sulfuric acid and 60% hydrogen peroxide solution at 45° C. or less for 10 to 30 min, then washing with water the graphite after the acid treatment, making the graphite contact with an aqueous solution of a hydroxide of an alkaline metal and/or alkaline earth metal after the water-washing or during the water-washing process, then filtering, and thereafter drying the graphite. Since the washing is performed using an aqueous compound such as a hydroxide of an alkaline metal and/or alkaline earth metal, an alkaline metal such as Na and K or an alkaline earth metal such as Ca and Mg may form a salt with a free acid contained in the thermally expandable graphite, and the alkaline metal and/or alkaline earth metal may be contained in the thermally expandable graphite; however, any problem does not arise.

The thermally expandable graphite used in the present invention preferably has an expansion coefficient, when the graphite is rapidly heated at 1,000° C. for 10 seconds, in the range of 50 to 250 ml/g from the viewpoint of expression of flame retardance effect.

The thermally expandable graphite preferably has a particle size of 20 to 150 mesh. The graphite having such a particle size can be obtained by pulverization and/or classification.

Further, the thermally expandable graphite of the present invention may be coated with various compounds; the coating agent specifically includes alkaline earth metal compounds such as calcium carbonate, calcium oxide, calcium hydroxide, magnesium carbonate, magnesium oxide, magnesium hydroxide, barium carbonate, barium oxide and barium hydroxide, and silicone-, titanium- and aluminum-based coupling agents.

The expansion initiating temperature of the thermally expandable graphite used in the present invention is preferably not less than 200° C., further preferably not less than 250° C., and especially preferably in the range of 280 to 400° C.; such a thermally expandable graphite is available in the market, for example, as SYZR1003, SYZR503 (trade name), etc., which are grades dealt with Sanyo Trading Co., Ltd.

Addition amount of the thermally expandable graphite (B) is 0.1 to 50 parts by mass, preferably 0.5 to 40 parts by mass, further preferably 0.5 to 35 parts by mass, and especially preferably 1 to 30 parts by mass based on the 100 parts by mass of component (A) of the present invention. With the addition amount of less than 0.1 parts by mass, no improved effect of the flame retardance can be obtained; and with that exceeding 50 parts by mass, the impact resistance largely decreases.

The component (C) of the present invention is a layered clay material modified with a water-soluble polymer. Methods for modifying a layered clay material include, for example, (1) a method wherein a solution in which a layered clay material is dispersed in water or hot water and a solution in which a water-soluble polymer is dissolved in water or hot water are mixed, and then the mixture is dried to obtain a target material, (2) a method wherein a layered clay material and a water-soluble polymer are dissolved and dispersed in water or hot water, and then the mixture is dried to obtain a target material, (3) a method of the combination of the above (1) and (2), and (4) a method wherein the aqueous solution of (1), (2) or (3), as it is, is used without being dried.

As the water-soluble polymer used here, known ones are all usable. Preferable ones are exemplified by polyvinyl alcohol-based polymers, polyethylene oxide-based polymers, polyethylene glycol-based polymers, acrylamide-based polymers, acetamide-based polymers, alkaline metal polyacrylate-based polymers, sulfonated polystyrene-based polymers, casein, gelatin, albumin and copolymers thereof. These water-soluble polymers may be used singly or in combination of two or more. These water-soluble polymers may be ones in which the terminals or side chains thereof are modified with functional groups such as an epoxy group, an amino group, a hydroxy group and a carboxyl group. They may further be ones in which the main chain thereof contains an alicyclic ring, aromatic ring, etc. Further preferable are polyvinyl alcohol-based polymers, polyethylene oxide-based polymers and polyethylene glycol-based polymers; especially preferable are polyvinyl alcohol-based polymers and polyethylene glycol-based polymers. As the polyvinyl alcohol-based polymer, any of completely saponified type and partially saponified type is usable. Polymerization degree thereof is preferably in the range of 100 to 5,000, and further preferably in the range of 100 to 2,500. As the polyethylene glycol-based polymer, one having a molecular weight of 200 to 20,000 is preferably used; especially preferable is an ethylene oxide adduct of a dihydroxyaryl compound described later as a component (F) of the present invention. The preferable addition mole number of the ethylene oxide in this component (C) is 6 or more moles, further preferably 8 or more moles, and especially preferably 8 moles to 20 moles per one molecule of the component (C).

The layered clay material includes natural, synthetic and modified silicates; the natural silicate includes smectite clay such as monmorillonite, saponite, hectorite, mica, vermiculite, bentonite, nontronite, beidellite, volkonskoite, magadite and kenyaite; the synthetic silicate includes a synthetic mica, synthetic saponite and synthetic hectorite; and the modified silicate includes a fluorinated monmorillonite and fluorinated mica. These layered clay materials may be used singly or in combination of two or more. These layered clay materials may be ones in which an organic material is intercalated between layers thereof by known methods, or ones in which it is not intercalated; however, as the layered clay material of the present invention, the layered clay material in which no organic material is substantially intercalated is preferably used.

The layered clay material of the present invention is an aggregate in which platelet particles are stacked, and each platelet particle preferably has a thickness of not more than 10 nm and a diameter of not more than 5,000 nm, and further preferably a thickness of 0.5 nm to 5 nm and a diameter of 10 nm to 1,000 nm.

A preferable layered clay material of the present invention is monmorillonite or mica; further preferable is monmorillonite; and especially preferable is one in which a cation intercalated between the layers is sodium.

The component (C) of the present invention is a water-soluble polymer-modified layered clay material obtained by dispersing a layered clay material in water, and further coating the dispersed layered clay material with a water-soluble polymer. The mass ratio of the layered clay material/the water-soluble polymer/water used in manufacture of the component (C) is preferably in the range of 1/0.01-100/10-10,000, further preferably 1/0.1-50/100-5,000, and especially preferably 1/0.2-5/500-3,000.

That is, the amount of the layered clay material relative to the total of the layered clay material and the water-soluble polymer of the component (C) is preferably 1 to 99% by mass, further preferably 2 to 91% by mass, and especially preferably 20 to 80% by mass.

The above-mentioned component (C) of the present invention is used in an amount of 0.001 to 30 parts by mass, preferably 0.01 to 20 parts by mass, further preferably 0.1 to 15 parts by mass, and especially preferably 0.5 to 10 parts by mass based on 100 parts by mass of the component (A) of the present invention. With the addition amount of less than 0.001 parts by mass, flame retardance is inferior; and with that exceeding 30 parts by mass, flame retardance and impact resistance are inferior.

The component (D) of the present invention is at least one selected from the group consisting of a silicone compound, a boron oxide, an aminotriazine sulfate compound and an aminotriazine compound.

The silicone compound used here contains, as essential components, a structural unit represented by the general formula (I) and a repeating structural unit represented by the general formula (II), and preferably not more than 80 mol % of a repeating structural unit represented by the general formula (III) or a repeating structural unit represented by the general formula (IV). The silicone compound which is oily, gummy, varnishy, powdery, rubbery and pellet-like can be used.

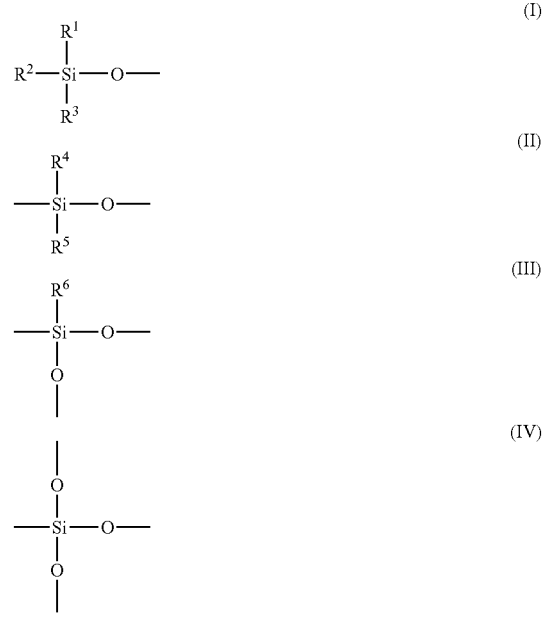

wherein, $R^1$ to $R^6$ are at least one independently selected from the group consisting of an alkyl group having 1 to 14 carbon atoms, a substituted alkyl group having 1 to 14 carbon atoms, an alkoxy group having 1 to 14 carbon atoms, an aryl group, an alkyl-substituted and/or alkylene-substituted aryl group, a hydrogen atom and a (meth)acryl group; generally, not less than 5 mol % of $R^1$ to $R^6$ is preferably an aryl group such as a phenyl group; further preferably, not less than 10 mol % to less than 80 mol % thereof is an aryl group; and especially preferably, not less than 30 mol % to less than 80 mol % thereof is an aryl group. $R^1$ to $R^6$ are each preferably a (meth)acryl group from the viewpoint of flame retardance.

The silicone compound of the present invention is preferably a branched polyorganosiloxane composed of the above-mentioned general formulas (I), (II) and (III); and further preferably, not less than 20 mol % to less than 80 mol % of $R^1$ to $R^6$ is an aryl group having 6 to 12 carbon atoms; and a phenylmethylpolysiloxane having a phenyl group as the aryl group and a methyl group as $R^1$ to $R^6$ other than the phenyl group is especially preferable.

As the polyorganosiloxane, one which is modified with an amino group, epoxy group, carboxy group, phenol group, etc. at a side chain, both terminals, one terminal or a side chain terminal can be used, and one modified with an amino group is especially preferable.

The alkyl group includes a methyl group, an ethyl group, a propyl group and a butyl group; and the substituted alkyl group includes a trifluoropropyl group. The alkoxy group includes a methoxy group, an ethoxy group and the like; and the aryl group includes a phenyl group, a tolyl group, a naphthyl group and the like.

The weight-average molecular weight of the silicone compound of the present invention is not especially limited, but is usually in the range of 300 to 1,000,000 as polystyrene equivalent measured using gel permeation chromatography (GPC).

The silicone compound of the present invention is manufactured by a general manufacturing method. A manufacturing method will be exemplified. Organohalosilanes are co-hydrolyzed in water in proportions corresponding to proportions of the unit constituting the above general formula (I) or the unit constituting the general formula (II) and the unit constituting the general formula (III) and/or the general formula (IV); the obtained hydrolyzed product is condensation-reacted; thereafter, the condensation-reacted product is dehydrated by equilibration-reaction using an alkaline metal hydroxide catalyst, whereby the silicone compound can be manufactured. The silicone compound can be manufactured by methods described in, for example, Japanese Patent Laid-Open (Kokai) Hei. No. 5-247212, etc.

The above silicone compound is used in an amount of 0.1 to 50 parts by mass, preferably 0.5 to 40 parts by mass, further preferably 0.5 to 35 parts by mass, and especially preferably 0.5 to 30 parts by mass based on 100 parts by mass of the component (A) of the present invention; with the addition amount of less than 0.1 parts by mass, flame retardance is inferior; and with that exceeding 50 parts by mass, flame retardance and impact resistance are inferior.

The boron oxide used in the present invention is generally produced from natural materials, and one containing a $B_2O_3$ component of not less than 80% by mass is preferably used. Silicon oxide, iron oxide, aluminum oxide, calcium oxide, magnesium oxide and the like may be contained as impurities, but the content of each of them is preferably not more than 5% by mass. The boron oxide which is pulverized to an average particle size of not more than 1,000 μm is preferably used from the viewpoint of surface appearance of final molded products.

The above boron oxide is used in an amount of 0.1 to 50 parts by mass, preferably 1 to 30 parts by mass, further preferably 5 to 20 parts by mass, and especially preferably 5 to 15 parts by mass based on 100 parts by mass of the component (A) of the present invention; with the addition amount of less than 0.1 parts by mass, flame retardance is inferior; and with that exceeding 50 parts by mass, impact resistance is inferior.

The aminotriazine sulfate compound is obtained by reacting an aminotriazine compound and sulfuric acid; and the aminotriazine compound includes an aminotriazine compound represented by the general formula (V) or (VI).

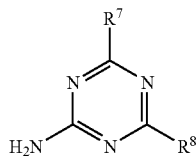

(V)

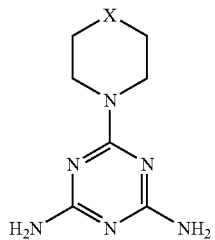

(VI)

wherein, in the general formulas (V) and (VI), $R^7$ and $R^8$ each individually denote an amino group, an alkyl group having 1 to 5 carbon atoms, an aryl group having 6 to 20 carbon atoms or an arylalkyl group having 7 to 20 carbon atoms; and X denotes O, S or NH.

In the above $R^7$ and $R^8$, the alkyl group having 1 to 5 carbon atoms includes, for example, a methyl group, ethyl group and propyl group; an aryl group having 6 to 20 carbon atoms includes a phenyl group and the like; and an arylalkyl group having 7 to 20 carbon atoms includes a benzyl group and the like. Specific examples of aminotriazine compounds preferably used include melamine, methylguanamine, benzoguanamine, benzylguanamine, 2,4-diamino-6-morpholino-1,3,5-triazine, 2,4-diamino-6-piperidino-1,3,5-triazine, 2,4-diamino-6-thiomorpholino-1,3,5-triazine and the like, and they may be used singly or in combination of two or more. Especially preferable is melamine. These aminotriazine compounds having an average particle size of 0.1 to 50 μm are preferably used, but the average particle size is not limited to the particle size range.

Sulfuric acid made to react with the above aminotriazine compound is commonly available one, and is not especially limited. Concentration of sulfuric acid is not especially limited, and a concentrated sulfuric acid and a dilute one are both usable, but a dilute sulfuric acid is preferably used from the viewpoint of handling. The molar ratio of an aminotriazine compound to sulfuric acid to be reacted (aminotriazine compound:sulfuric acid) is preferably 1:0.1-1, further preferably 1:0.2-0.8. With the molar ratio of sulfuric acid of less than 0.1, the effect of imparting water resistance to the aminotriazine compound is unfavorably low. In contrast, with the molar ratio of sulfuric acid of more than 1, since unreacted sulfuric acid is liable to be left, washing with a large amount of water is unfavorably needed. Methods for reacting an aminotriazine compound and sulfuric acid are not especially limited, and the reaction can be achieved by known methods. The methods include, for example, one in which sulfuric acid is little by little or collectively added after an aminotriazine compound has been dispersed in water in advance, one in which sulfuric acid is added under stirring while an aminotriazine compound is being pulverized at room temperature in a ball mill, etc., and one in which an aminotriazine compound is added to sulfuric acid. The reaction condition is not especially limited, and the reaction can be performed at room temperature. The pressure may be either of reduced pressure and ordinary pressure.

The obtained aminotriazine sulfate compound has an average particle size of preferably not more than 50 μm, further preferably 0.01 to 30 μm, and especially preferably 0.1 to 15 μm.

As the aminotriazine compound of the present invention, the aminotriazine compounds described concerning the above-mentioned aminotriazine sulfate compound are all usable.

The aminotriazine sulfate compound and the aminotriazine compound of the present invention are each used in the range of 0.1 to 50 parts by mass, preferably 3 to 40 parts by mass, further preferably 5 to 30 parts by mass, and especially preferably 5 to 25 parts by mass based on 100 parts by mass of the component (A) of the present invention. With less than 0.1 parts by mass, flame retardance is inferior; and with exceeding 50 parts by mass, impact resistance is inferior.

The component (D) of the present invention is at least one selected from the group consisting of a silicone compound, a boron oxide, an aminotriazine sulfate compound and an aminotriazine compound, and preferably a silicone compound or a combination of a silicone compound and a boron oxide, a silicone compound and an aminotriazine sulfate compound, or a silicone compound and an aminotriazine compound.

The component (E) of the present invention is at least one selected from the group consisting of an aromatic polycarbonate, a polyphenylene sulfide, a polyamide, a thermoplastic polyester and a phenolic resin.

As the aromatic polycarbonate, ones obtained by known methods including one which is obtained by interfacial polycondensation of various hydroxyaryl compounds and phosgene, and one which is obtained by transesterification reaction (melt polycondensation) of a dihydroxyaryl compound and a carbonate compound such as diphenylcarbonate, are all usable. The dihydroxyaryl compound, which is a raw material of the aromatic polycarbonate, includes bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)propane, 2,2-bis(4-hydroxy-3-tert-butylphenyl)propane, 2,2-bis(4-hydroxy-3-tert-butylphenyl)propane, 1,1-bis(4-hydroxyphenyl)cyclopentane, 1,1-bis(4-hydroxyphenyl)cyclohexane, 4,4'-dihydroxyphenyl ether, 4,4'-dihydroxyphenyl sulfide, 4,4'-dihydroxy-3,3'-dimethylphenyl sulfoxide, 4,4'-dihydroxyphenyl sulfone, 4,4'-dihydroxy-3,3'-dimethyldiphenyl sulfone, hydroquinone, and resorcin and further a hydroxyaryloxy-terminated polyorganosiloxane (e.g., see U.S. Pat. No. 3,419,634 specification), and they may be used singly or in combination of two or more. Especially preferable is 2,2-bis(4-hydroxyphenyl)propane(bisphenol A). As the above-mentioned aromatic polycarbonate, various polycarbonates obtained from the above raw materials may be used singly or in combination of two or more.

The viscosity-average molecular weight of the above-mentioned aromatic polycarbonate used in the present invention is preferably 13,000 to 32,000, further preferably 17,000 to 31,000, and especially preferably 18,000 to 30,000. Aromatic polycarbonates having different viscosity-average molecular weights can also be used together.

Here, the viscosity-average molecular weight of an aromatic polycarbonate can generally be calculated by substituting in the following equation a specific viscosity ($\eta_{sp}$) measured at 20° C. in methylene chloride as the solvent of a concentration of 0.7 g/100 ml (methylene chloride).

Viscosity-average molecular weight=$([\eta] \times 8130)^{1.205}$ (wherein, $[\eta]=[(\eta_{sp} \times 1.12+1)^{1/2}-1]/0.56C$; C denotes a concentration.)

Among the aromatic polycarbonates used in the present invention, those which are obtained by interfacial polycondensation sometimes contain chlorine compounds. Since the chlorine compounds sometimes adversely affect thermal stability of the flame retardant resin composition of the present invention, the chlorine compound content of the aromatic polycarbonate is preferably not more than 300 ppm, and further preferably not more than 100 ppm in terms of chlorine atom.

The above-mentioned aromatic polycarbonate of the component (E) of the present invention is preferably used in an amount of 5 to 90% by mass, preferably 30 to 90% by mass, further preferably 40 to 90% by mass, and especially preferably 50 to 90% by mass based on 100% by mass of the total of the component (A) and the component (E). With the addition amount of less than 5% by mass, it has no effect of improving flame retardance; and with that exceeding 90% by mass, impact resistance tends to decrease.

The polyarylene sulfide used in the present invention is a polymer which is essentially composed of arylene groups bonded with each other through sulfide groups, and represented by the following general formula (VII).

$(-\text{Ar}-\text{S}-)_n$         (VII)

(wherein, Ar denotes a substituted or unsubstituted arylene group, preferably a phenylene group; and n is preferably a number larger than 50.)

The polyarylene sulfide used in the present invention may be a straight chain, branched chain or cross-linked one.

Preferable starting compounds and production methods for polyarylene sulfides are described in, for example, U.S. Pat. No. 3,354,129 specification and U.S. Pat. No. 3,919,177 specification. In the production, polyarylene sulfides are obtained by allowing a polyhalogenated aromatic compound to react with a sulfur-containing compound in a polar solvent in the presence of a catalyst.

Suitable polyhalogenated aromatic compounds include, for example, 1,2-dichlorobenzene, 1,3-dichlorobenzene, 1,4-dichlorobenzene, 2,5-dichlorotoluene, 1,4-dibromobenzene, 2,5-dibromoaniline and a mixture thereof. When a branched chain polyarylene sulfide is produced, at least 0.05 mol % of the polyhalogenated aromatic compound is preferably constituted by an aromatic trihalogen or tetrahalogen compound, for example, 1,2,4-trichlorobenzene, 1,3,5-trichlorobenzene or 1,2,4,5-tetrachlorobenzene.

Suitable sulfur-containing compounds include alkaline metal sulfides, for example, sodium sulfide and potassium sulfide. Hydrates of these alkaline metal sulfides are especially preferable. The alkaline metal sulfide can be produced from hydrogen sulfide using an alkali hydroxide such as lithium hydroxide and sodium hydroxide.

Suitable polar solvents include, for example, N-methylpyrrolidone, N-ethylpyrrolidone, N-methylcaprolactam, N-ethylcaprolactam and 1,3-dimethylimidazoline. Suitable catalysts include, for example, substances such as alkali fluorides, alkali phosphates and alkali carboxylates, and the catalyst is preferably used in an amount of 0.02 to 1.0 mol per one mole of an alkaline metal sulfide.

The above-mentioned polyarylene sulfide of the component (E) of the present invention is used in an amount of 5 to 90% by mass, preferably 30 to 90% by mass, further preferably 40 to 90% by mass, and especially preferably 50 to 90% by mass based on 100% by mass of the total of the component (A) and the component (E). With the addition amount of less than 5% by mass, it has no effect of improving flame retardance; and with that exceeding 90% by mass, impact resistance unfavorably largely decreases.

The polyamide used in the present invention includes a polyamide driven from an aliphatic, alicyclic or aromatic polyamine such as ethylenediamine, tetramethylenediamine, hexamethylenediamine, decamethylenediamine, dodecamethylenediamine, 2,2,4-trimethylhexamethylenediamine, 2,4,4-trimethylhexamethylenediamine, 1,3-bis(aminomethyl)cyclohexane, 1,4-bis(aminomethyl)cyclohexane, bis(p-aminocyclohexyl)methane, m-xylenediamine and p-xylenediamine, and an aliphatic, alicyclic or aromatic dicarboxylic acid; and a polyamide driven from 6-aminocaproic acid, 1,1-aminoundecanoic acid, 1,2-aminododecanoic acid and the like, a copolymerized polyamide thereof and a mixed polyamide thereof, preferably a nylon 6 (polycaproamide), nylon 6,6 (polyhexamethyleneadipamide), nylon 12 (polydodecamide), nylon 6,10 (polyhexamethylenesebacamide), nylon 4,6 (polytetramethyleneadipamide), a copolymer thereof and a mixture thereof.

Polymerization degree of the polyamide used in the present invention is not especially limited; but generally, a polyamide having a relative viscosity (measured at 30° C. in a solution of 2 g of a polymer in 100 ml of formic acid (purity: 90% by mass)) in the range of 1.6 to 6.0, further preferably 2.0 to 5.0, is arbitrarily used.

The above-mentioned polyamide of the component (E) of the present invention is used in an amount of 5 to 90% by mass, preferably 30 to 90% by mass, further preferably 40 to 90% by mass, and especially preferably 50 to 90% by mass based on 100% by mass of the total of the component (A) and the component (E). With the addition amount of less than 5% by mass, it has no effect of improving flame retardance; and with that exceeding 90% by mass, impact resistance unfavorably decreases.

The thermoplastic polyester used in the present invention includes ones which are obtained by polycondensating a dicarboxylic acid, an ester thereof or an ester-forming derivative thereof and a diol component by known methods, and they may be used singly or in combination of two or more.

Examples of the dicarboxylic acid include terephthalic acid, isophthalic acid, adipic acid, sebacic acid, naphthalene-2,6-dicarboxylic acid and the like, and an ester-forming derivative thereof can also be used as a component of a thermoplastic polyester of the present invention. p-Hydroxybenzoic acid may be used singly or in combination with a diol component or a dicarboxylic acid component.

The diol component includes, for example, a polymethylene glycol having 2 to 6 carbon atoms (e.g., ethylene glycol, 1,4-butanediol, 1,6-hexanediol), 1,4-cyclohexanediol, bisphenol A, hydroquinone and an ester-forming derivative thereof, and the above-mentioned dicarboxylic acid components and the above-mentioned diol components may be each used singly or in combination of two or more.

Preferable thermoplastic polyesters include polybutylene terephthalate, polyethylene terephthalate, polyethylene naphthalate and the like, and further preferable are polybutylene terephthalate and polyethylene terephthalate.

The thermoplastic polyester of the present invention may be used singly or in combination of two or more.

Intrinsic viscosity of the thermoplastic polyester used in the present invention is not especially limited, but for a polybutylene terephthalate, one in which the intrinsic viscosity [η] (unit: dl/g) measured at 25° C. in o-chlorophenol as the solvent is in the range of 0.4 to 2.0 is preferably used.

For a polyethylene terephthalate, the intrinsic viscosity [η](unit: dl/g) measured at 25° C. in an equivalently mixed solvent of tetrachloroethane and phenol is preferably 0.5 to 2.0, and further preferably 0.5 to 1.5.

The above-mentioned thermoplastic polyester of the component (E) of the present invention is used in an amount of 5 to 90% by mass, preferably 30 to 90% by mass, further preferably 40 to 90% by mass, and especially preferably 50 to 90% by mass based on 100% by mass of the total of the component (A) and the component (E). With the addition amount of less than 5% by mass, it has no effect of improving flame retardance; and with that exceeding 90% by mass, impact resistance unfavorably decreases.

The phenolic resin used in the present invention is not limited as long as it is a polymer that has a plurality of phenolic hydroxide groups, and includes, for example, a novolac one, resol one and thermally reactive one and a modified one thereof.

The phenolic resin is not especially limited, and commercially available ones, etc. are used. For example, a novolac phenol resin is obtained by a method in which phenols and aldehydes are charged in a reaction bath in a molar ratio of phenols to aldehydes of 1:0.7 to 1:0.9, supplemented further with a catalyst such as oxalic acid, hydrochloric acid, sulfuric acid and toluenesulfonic acid, heated, and made to react while being refluxed for a prescribed time; and the resultant product is dehydrated in vacuo or under ventilation for removing generated water, and the left water and unreacted phenols are further removed. These resins or co-condensed phenol resins obtained using a plurality of raw material components may be used singly or in combination of two or more.

On the other hand, a resol phenol resin is obtained by charging phenols and aldehydes in a molar ratio of 1:1 to 1:2 in a reaction bath, adding thereto a catalyst such as sodium hydroxide, aqueous ammonia and other basic substances, and thereafter subjecting the resultant product to the reaction and process similar to the novolac phenol resin.

Here, the phenols include phenol, o-cresol, m-cresol, p-cresol, thymol, p-tert-butylphenol, tert-butylcatechol, catechol, isoeugenol, o-methoxyphenol, 4,4'-dihydroxyphenyl-2,2-propane, isoamyl salicylate, benzyl salicylate, methyl salicylate, 2,6-di-tert-butyl-p-cresol and the like. These phenols may be used singly or in combination of two or more.

On the other hand, the aldehydes include formaldehyde, paraformaldehyde, polyoxymethylene, trioxane and the like, and they may optionally be used singly or in combination of two or more.

Further, the phenolic resin used in the present invention may be partially reacted or cross-linked with a compound other than phenols. Such a compound includes epoxy compounds, melamines, ureas, benzoguanamines, acetoguanamines, xylene and furans, and may be a mixture thereof.

Molecular weight of the phenolic resin is not especially limited, but is preferably in an amount of 300 to 200,000 in number-average; and softening temperature thereof is preferably not less than 60° C., further preferably 80° C. to 200° C., especially preferably 100° C. to 150° C.

The molecular weight of a phenolic resin can be measured by the gel permeation method in tetrahydrofuran using a phenol resin standard sample.

The above-mentioned phenolic resin of the component (E) of the present invention is used in an amount of 5 to 90% by mass, preferably 5 to 50% by mass, further preferably 10 to 40% by mass, and especially preferably 10 to 30% by mass based on 100% by mass of the total of the component (A) and the component (E). With the addition amount of less than 5% by mass, it has no effect of improving flame retardance; and with that exceeding 90% by mass, impact resistance unfavorably decreases.

Preferable components of the above-mentioned component (E) of the present invention are aromatic polycarbonates, polyamides and thermoplastic polyesters; and further preferable are aromatic polycarbonates. The component (E) of the present invention may be used singly or in combination of two or more. A preferable combination in the case of using the combination of two or more is an aromatic polycarbonate and a thermoplastic polyester.

The component (F) of the present invention is an alkylene oxide adduct of a dihydroxyaryl compound, and can generally be manufactured by addition of an alkylene oxide to a dihydroxyaryl compound.

The dihydroxyaryl compound used here includes bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)propane, 2,2-bis(4-hydroxy-3-tert-butylphenyl)propane, 1,1-bis(4-hydroxyphenyl)cyclopentane, 1,1-bis(4-hydroxyphenyl)cyclohexane, 4,4-dihydroxyphenyl ether, 4,4'-dihydroxy-3,3'-dimethyl diphenyl ether, 4,4'-dihydroxyphenyl sulfide, 4,4'-dihydroxy-3,3'-dimethylphenyl sulfoxide, 4,4'-dihydroxyphenyl sulfone, 4,4'-dihydroxy-3,3'-dimethyldiphenyl sulfone, hydroquinone, resorcin and the like, and may be used singly or in combination of two or more. Especially preferable is 2,2-bis(4-hydroxyphenyl)propane (bisphenol A).

Preferable alkylene oxides added to the above-mentioned dihydroxyaryl compound are an ethylene oxide and propylene oxide; and especially preferable is an ethylene oxide. The addition molar number of an alkylene oxide added to one molecule of a dihydroxyaryl compound is preferably 1 mol to 80 mol, further preferably 1 mol to 20 mol, and especially preferably 2 mol to 10 mol.

The above-mentioned component (F) of the present invention may be used singly or in combination of two or more.

Alkylene oxide adducts to bisphenol A are industrially available under the Newpol BPE series and BP series manufactured by Sanyo Chemical Industries, Ltd.

The component (F) of the present invention is used in an amount of 0.1 to 30 parts by mass, preferably 0.5 to 25 parts by mass, further preferably 0.5 to 20 parts by mass, and especially preferably 1 to 15 parts by mass based on 100 parts by mass of the component (A) (note, 100 parts by mass of the total of the component (A) and the component (E) in the case of formulating the component (E)). With the addition amount of less than 0.1 parts by mass, flame retardance is not improved; and with that exceeding 30 parts by mass, flame retardance and impact resistance are inferior.

The component (G) of the present invention is a metal oxide and/or a metal salt of an inorganic acid, and exemplified as follows. Specifically, the metal oxide includes magnesium oxide, aluminum oxide, silicon oxide, aluminum oxide/silicon oxide composite, calcium oxide, titanium oxide, vanadium oxide, chromium oxide, manganese oxide, iron oxide, cobalt oxide, nickel oxide, copper oxide, zinc oxide and the like. The metal salt of an inorganic acid includes zinc borate. Among these, preferable are silicon oxide, aluminum oxide, aluminum oxide/silicon oxide composite, titanium oxide, zinc oxide, zinc borate, iron oxide and copper oxide; and especially preferable are silicon oxide, titanium oxide, zinc oxide and zinc borate. Those having an average particle size of not more than 20 μm are preferably used.

The component (G) may be used singly or in combination of two or more. Preferable combinations include zinc oxide/titanium oxide, titanium oxide/zinc borate, zinc oxide/zinc borate and zinc oxide/titanium oxide/zinc borate.

The component (G) of the present invention is used in the range of 0.0001 to 20 parts by mass, preferably 0.001 to 15 parts by mass, further preferably 0.005 to 10 parts by mass, especially preferably 0.01 to 10 parts by mass based on 100 parts by mass of the component (A) (note, 100 parts by mass of the total of the component (A) and the component (E) in the case of formulating the component (E)). With the addition amount of less than 0.0001 parts by mass, flame retardance is not improved; and with that exceeding 20 parts by mass, impact resistance is inferior.

The flame retardant resin composition of the present invention can be prepared by kneading the components by a method using an extruder, Banbury mixer, kneader, continuous kneader, roll, etc. or a combination thereof. A preferable manufacturing method is one using an extruder: and especially preferable are a method using a twin screw extruder, Banbury mixer, continuous kneader or a combination thereof.

Further, when the components are kneaded, the components may be kneaded entirely, in a multi-stage or dividedly.

With the flame retardant resin composition of the present invention, known inorganic fillers can be blended. The inorganic fillers used here include glass fiber, glass flake, milled glass, glass bead, hollow glass, carbon fiber, milled fiber of carbon fiber, talc, calcium carbonate, calcium carbonate whisker, wallastonite, mica, kaolin, monmorillonite, hectorite, zinc oxide whisker, potassium titanate whisker, aluminum borate whisker, laminar alumina, laminar silica, organically modified smectite, organically modified monmorillonite and the like, and they may be used singly or in combination of two or more. Further, for the purpose of improving dispersibility of inorganic fillers, those may be surface-treated with known coupling agents. The known coupling agents include a silane coupling agent, aluminum coupling agent, titanate coupling agent and the like.

Organic fillers such as aramid fiber, phenol fiber and polyester fiber can be blended.

These fillers are commonly used in an amount of 1 to 100 parts by mass based on 100 parts by mass of the flame retardant resin composition of the present invention.

With the flame retardant resin composition of the present invention, a known weather- (light-) resistant agent, antistatic agent, antioxidant, thermal stabilizer, lubricant, plasticizer, colorant, dye, antimicrobial agent, fungicide, foaming agent and the like can be blended.

Further, with the flame retardant resin composition of the present invention, other known polymers, such as PTFE, polypropylene, polyethylene, polyamide elastomer, polyester elastomer, polyphenylene ether, epoxy resin, LCP, polyurethane, phenoxy resin and urea resin, can suitably be blended.

From the flame retardant resin composition of the present invention prepared in such a manner, molded articles can be obtained by known molding methods such as injection molding, press molding, sheet extrusion molding, vacuum molding, profile extrusion molding and foaming molding. Articles molded by these molding methods are exemplified as follows:

Electric and electronic parts represented by various gears, various cases, sensors, LEP lamps, connectors, sockets, resistors, relay cases, switches, coil bobbins, capacitors, variable capacitor cases, battery cases, optical pick-up parts, oscillators, various terminal boards, transformers, plugs, printed wiring boards, tuners, speakers, microphones, headphones, small motors, magnetic head cases, power module holders, parabolic antennas, personal computers, printers, displays, CRT displays, notebook computers, mobile phones, PHSs, housings for memory devices such as DVD drives, PD drives, flexible disc drives, etc., chassis, relays, switches and parts of cases, transformer parts, other computer-, facsimile- and copying machine-related parts, and the like;

Electric parts of household electric appliances and office equipment represented by VTR parts, television parts, irons, hair driers, rice cooker parts, microwave oven parts, audio parts, audio equipment parts for audio•laser disc® and compact disc, illumination equipment parts, refrigerator parts, and the like;

Sanitation-related parts, such as toilet seats, tank covers, casings, kitchen-related parts, washstand-related parts, bathroom-related parts, and the like;

House- or house equipment-related parts, such as window frames, furniture, floor materials, wall materials, and the like;

Optical device- and precision equipment-related parts represented by microscopes, binoculars, cameras, watches, and the like; and Vehicle-related parts, such as alternator terminals, alternator connectors, IC regulators, various valves such as exhaust gas valves, various valves such as for fuel, exhaust system and intake system, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, thermostat bases for air conditioner, for-heating warm air flow control valves, brush holders for radiator motor, water pump impellers, turbine vanes, wiper motor-related parts, distributors, starter switches, starter relays, wiper harnesses for transmission, window washer nozzles, air conditioner panel switch boards, coil bobbins for fuel-related electromagnetic valves, connectors for fuse, horn terminals, electric equipment insulation boards, switch motor rollers, lamp sockets, lamp reflectors, lamp housings, brake pistons, solenoid bobbins, engine oil filters, igniter cases, and the like. And, various other applications.

EXAMPLES

Hereinafter, the present invention will be in more detail described by way of examples, but the scope of the present invention is not limited to the examples, without departing from the spirit and scope of the present invention. Herein, 'parts' and '%' in the examples are expressed by mass unless otherwise specified. The measurements in the examples and the comparative examples were conducted according to the following methods.

[1] Evaluation Methods (1) Gel content of a rubber-like polymer: This was obtained according to the method described before.

(2) Average particle size of a rubber-like polymer latex:

The average particle size of a rubber-like polymer latex used for forming the component (A) was measured by means of light scattering. As the measuring instrument, an LPA-3100 type manufactured by Otsuka Electronics Co., Ltd. was used; and the cumulant method at 70-times integration was used. Then, the particle size of a dispersed grafted rubber-like polymer in the component (A) was confirmed to be nearly equal to the latex particle size by an electron microscope.

(3) Graft ratio of a component (A): This was measured according to the method described before.

(4) Limiting viscosity $[\eta]$ of an acetone-soluble matter in a component (A): This was measured according to the method described before.

(5) Combustibility (Combustibility-1)

The limiting oxygen index (LOI, %) was measured using a limiting oxygen index measuring instrument (Combustibility Tester ONI METER, manufactured by Suga Test Instruments Co., Ltd.) and test sample pieces (according to ASTM test method, D2863).

(Combustibility-2)

The time (sec) till automatic extinction at an oxygen concentration of 24% was measured using a limiting oxygen index measuring instrument (Combustibility Tester ONI METER, manufactured by Suga Test Instruments Co., Ltd.) and test sample pieces (according to ASTM test method, D2863). The shorter the time from ignition till automatic extinction is, the higher the flame retardance is. The case of combustion continuing for 60 seconds or more is shown as x.

(Combustibility-3)

Test sample pieces of 1.6 mm in thickness were tested according to the UL94V test.

(Combustion-4)

When five test sample pieces were allowed to burn in Combustibility-3, the total of the combustion times was measured.

(6) Impact Resistance

Charpy impact strength ($kJ/m^2$) with notch was measured according to the ISO test method 179.

[2] Components of Flame Retardant Resin Compositions (1) Components (A)

(1-1) Production Example A1: ABS Resin

To a glass flask having an internal volume of 7 L and equipped with a stirrer, 75 parts of ion exchange water, 0.5 part of potassium rosinate, 40 parts (solid content) of a polybutadiene latex (average particle size: 3,500 Å, gel content: 85%), 15 parts of styrene, 5 parts of acrylonitrile and 0.1 part of tert-dodecylmercaptane were added; and the temperature of the mixture was raised under stirring. At the time when the internal temperature reached 45° C., a solution in which 0.2 part of sodium pyrophosphate, 0.01 part of ferrous sulfate heptahydrate and 0.2 part of glucose were dissolved in 20 parts of ion exchange water was added. Thereafter, 0.07 part of cumene hydroperoxide was added to initiate polymerization. After the polymerization was effected for 1 h, 50 parts of ion exchange water, 0.7 part of potassium rosinate, 30 parts of styrene, 10 parts of acrylnitrile, 0.05 part of tert-dodecylmercaptane and 0.01 part of cumene hydroperoxide were further continuously added over 3 hours; after the polymerization was further continued for 1 hour, 0.2 part of 2,2'-methylene-bis(4-ethyl-6-tert-butylphenol) was added to complete the polymerization. The reaction product, namely, latex was coagulated with a sulfuric acid aqueous solution, washed with water, and then dried to obtain a styrene resin A1. The graft ratio of the styrene resin A1 was 68%, and the limiting viscosity $[\eta]$ of the acetone-soluble matter thereof was 0.45 dl/g.

(1-2) Production Example A2: AS Resin

Two polymerization reaction vessels of 30 L in internal volume equipped with a ribbon vane and a jacket were connected, and replaced with nitrogen; and thereafter, to the first reaction vessel, 75 parts of styrene, 25 parts of acrylonitrile, 20 parts of toluene, a solution of 0.12 part of tert-dodecylmercaptane as a molecular weight adjusting agent in 5 parts of toluene, and further a solution of 0.1 part of 1,1'-azobis(cyclohexane-1-carbonitrile) as a polymerization initiator in 5 parts of toluene were continually added. Polymerization temperature of the first vessel was controlled to be 110° C.; the average retention time was 2.0 hours; and conversion to polymers was 57%.

The obtained polymer solution was taken out successively in the same amount as the supplied amount of the styrene, acrylonitrile, toluene, molecular weight adjusting agent and polymerization initiator by a pump installed outside of the first reaction vessel, and supplied to a second reaction vessel. Polymerization temperature of the second reaction vessel was 130° C.; and conversion to polymers was 75%. The unreacted monomers and the solvent were directly devolatized from the copolymer solution obtained by the second reaction vessel, using a two screw extruder with three-stage vents to obtain a styrene resin A2 having a limiting viscosity [η] of 0.48 dl/g.

(1-3) Production Example A3: AS resin

All the processes of Production Example A2 were repeated except that the addition amounts of styrene and acrylonitrile used in Production Example A2 were changed to 65 parts of styrene and 35 parts of acrylonitrile, and a styrene resin A3 having a limiting viscosity [η] of 0.44 dl/g was obtained.

(2) Component (B)

As a thermally expandable graphite, SYZR503 (trade name) (expansion initiation temperature: 300° C.) of Sanyo Trading Co., Ltd. was used.

(3) Components (C)

(3-1) Production Example C1

A solution in which 3 parts of a polyvinyl alcohol having a polymerization degree of 600 and a saponification rate of 75 mol % was dissolved in 100 parts of water, and a solution in which 5 parts of a sodium ion-containing monmorillonite (Closite Na+ (trade name), manufactured by Southern Clay Products, Inc.) was dispersed in 1,000 parts of water, were prepared.

The solutions were each homogeneously mixed over 2 hours while being stirred and sonicated, then dried at 60° C. for 24 hours using a vacuum drier, and thereafter, pulverized to obtain a micropowder C1. Monmorillonite content thereof was 62.5%.

(3-2) Production Example C2

All the processes were conducted under the condition of Production Example C1, except that Newpol BPE-100 (trade name), manufactured by Sanyo Chemical Industries, Ltd., as an ethylene oxide addition to bisphenol A in place of the polyvinyl alcohol in Production Example C1 to obtain C2 of a monmorillonite content of 62.5%.

D1: As a silicone compound, KR-511, manufactured by Shin-Etsu Chemical Co., Ltd., (trade name of a methylphenyl-based silicone oligomer) was used.

D2: As a silicone compound, X-40-9805, manufactured by Shin-Etsu Chemical Co., Ltd., (trade name of a methylphenyl-based silicone resin) was used.

D3: As a boron oxide, a reagent of Wako Pure Chemical Industries, Ltd., was used.

D4: As an aminotriazine sulfate compound, melamine sulfate, Apinon 901 (trade name), manufactured by Sanwa Chemical Co., Ltd., was used.

(4) Component (E)

As an aromatic polycarbonate, Novarex 7022PJ (trade name) (viscosity-average molecular weight: 22,000), manufactured by Mitsubishi-Engineering Plastics Corp., was used.

(5) Component (F)

As an ethylene oxide adduct of bisphenol A, Newpol BPE-20 (trade name), manufactured by Sanyo Chemical Industries, Ltd., was used.

(6) Components (G)

As the component (G) of the present invention, the following were used.

G1: A titanium oxide microparticle, TTO-51C (trade name), manufacture by Ishihara Sangyo Kaisya Ltd.

G2: A zinc borate, Storflam ZB2335 (trade name), sold by Nihon Seiko Co., Ltd.

G3: A zinc oxide micropowder (average particle size: 0.3 μm), manufactured by Sakai Chemical Industry Co., Ltd.

Examples 1 to 13, Comparative Examples 1 to 6

All components in the formulation ratios described in Table 1 were mixed by a Henshel mixer, then melt-kneaded using a two screw extruder (the cylinder preset temperature is described in Table 1), and pelletized. The obtained pellet was fully dried, and test sample pieces for evaluation were fabricated by an injection molding machine (the cylinder preset temperature is described in Table 1). Using the test sample pieces, flame retardance and impact resistance were evaluated by the above-mentioned methods.

TABLE 1

| | | (A) Component | | (B) Component | (C) Component | | (D) Component | | (E) Component | (F) Component | (G) Component | |
|---|---|---|---|---|---|---|---|---|---|---|---|---|
| | | Kind | Parts | Parts | Kind | Parts | Kind | Parts | Parts | Parts | Kind | Parts |
| Example | 1 | A1 | 35 | 15 | C1 | 1 | D1 | 5 | — | — | — | — |
| | | A3 | 65 | | | | | | | | | |
| | 2 | A1 | 35 | 15 | C2 | 1 | D1 | 5 | — | — | — | — |
| | | A3 | 65 | | | | | | | | | |
| | 3 | A1 | 35 | 15 | C1 | 1 | D1 | 5 | — | — | — | — |
| | | A2 | 65 | | | | | | | | | |
| | 4 | A1 | 35 | 15 | C1 | 1 | D3 | 10 | — | — | — | — |
| | | A3 | 65 | | | | | | | | | |
| | 5 | A1 | 35 | 15 | C1 | 1 | D4 | 15 | — | — | — | — |
| | | A3 | 66 | | | | | | | | | |

TABLE 1-continued

| | No. | A | | B | C | | D | | | | G | |
|---|---|---|---|---|---|---|---|---|---|---|---|---|
| | 6 | A1 | 35 | 15 | C1 | 0.5 | D1 | 5 | — | — | | |
| | | A3 | 66 | | | | | | | | | |
| | 7 | A1 | 35 | 15 | C1 | 2 | D1 | 5 | — | — | — | — |
| | | A3 | 65 | | | | | | | | | |
| | 8 | A1 | 35 | 15 | C1 | 1 | D1 | 5 | — | 4 | — | — |
| | | A3 | 65 | | | | | | | | | |
| | 9 | A1 | 35 | 10 | C1 | 1 | D1 | 5 | — | 4 | G3 | 3 |
| | | A3 | 65 | | | | | | | | | |
| | 10 | A1 | 17 | 5 | C1 | 1 | D2 | 5 | 80 | 2 | G1 | 0.05 |
| | | A2 | 5 | | | | | | | | G2 | 5 |
| | 11 | A1 | 17 | 3 | C1 | 1 | D2 | 1 | 80 | 2 | G1 | 0.05 |
| | | A2 | 5 | | | | | | | | G2 | 5 |
| | 12 | A1 | 25 | 3 | C1 | 1 | D2 | 2 | 70 | 2 | G1 | 0.05 |
| | | A2 | 5 | | | | | | | | G2 | 5 |
| | 13 | A1 | 25 | 5 | C1 | 1 | D2 | 3 | 70 | 4 | — | — |
| | | A2 | 5 | | | | | | | | | |
| Comparative Example | 1 | A1 | 35 | 0.01 | C1 | 1 | D1 | 5 | — | — | — | — |
| | | A3 | 65 | | | | | | | | | |
| | 2 | A1 | 35 | 60 | C1 | 1 | D1 | 5 | — | — | — | — |
| | | A3 | 65 | | | | | | | | | |
| | 3 | A1 | 35 | 15 | C1 | 0.0001 | D1 | 5 | — | — | — | — |
| | | A3 | 65 | | | | | | | | | |
| | 4 | A1 | 35 | 15 | C1 | 50 | D1 | 5 | — | — | — | — |
| | | A3 | 65 | | | | | | | | | |
| | 5 | A1 | 35 | 15 | C1 | 1 | D1 | 0.01 | — | — | — | — |
| | | A3 | 65 | | | | | | | | | |
| | 6 | A1 | 35 | 15 | C1 | 1 | D1 | 60 | — | — | — | — |
| | | A3 | 65 | | | | | | | | | |

| | | | Extruder temperature (°C.) | Molding machine temperature (°C.) | Evaluation Result | | | | |
|---|---|---|---|---|---|---|---|---|---|
| | | | | | Combustibility −1 (%) | Combustibility −2 (Sec) | Combustibility −3 | Combustibility −4 (Sec) | Impact resistance (kJ/m²) |
| Example | | 1 | 200 | 200 | 28 | 18 | — | — | 9 |
| | | 2 | 200 | 200 | 28 | 18 | — | — | 9 |
| | | 3 | 200 | 200 | 27 | 20 | — | — | 11 |
| | | 4 | 200 | 200 | 27 | 17 | — | — | 8 |
| | | 5 | 200 | 200 | 27 | 15 | — | — | 8 |
| | | 6 | 200 | 200 | 28 | 18 | — | — | 9 |
| | | 7 | 200 | 200 | 28 | 18 | — | — | 9 |
| | | 8 | 200 | 200 | 30 | 5 | V-1 | 85 | 10 |
| | | 9 | 200 | 200 | 31 | 6 | V-1 | 92 | 9 |
| | | 10 | 240 | 240 | 36 | 1 | V-0 | 28 | 16 |
| | | 11 | 240 | 240 | 35 | 1 | V-0 | 35 | 17 |
| | | 12 | 240 | 240 | 33 | 3 | V-0 | 42 | 15 |
| | | 13 | 240 | 240 | 32 | 3 | V-0 | 46 | 15 |
| Comparative Example | | 1 | 200 | 200 | 20 | x | — | — | 13 |
| | | 2 | 200 | 200 | 27 | 16 | — | — | 2 |
| | | 3 | 200 | 200 | 26 | 32 | — | — | 9 |
| | | 4 | 200 | 200 | 24 | x | — | — | 1 |
| | | 5 | 200 | 200 | 22 | x | — | — | 8 |
| | | 6 | 200 | 200 | 21 | x | — | — | 2 |

The followings are clarified from the results shown in Table 1.

The molded articles of Examples 1 to 13 of the present invention are superior in both flame retardance and impact resistance.

In contrast, Comparative Example 1 is an example in which the addition amount of the component (B) of the present invention is small and outside the scope of the invention, and is inferior in flame retardance. Comparative Example 2 is an example in which the addition amount of the component (B) of the present invention is large and outside the scope of the invention, and is inferior in impact resistance. Comparative Example 3 is an example in which the addition amount of the component (C) of the present invention is small and outside the scope of the invention, and is inferior in flame retardance. Comparative Example 4 is an example in which the addition amount of the component (C) of the present invention is large and outside the scope of the invention, and is inferior in flame retardance and impact resistance. Comparative Example 5 is an example in which the addition amount of the component (D) of the present invention is small and outside the scope of the invention, and is inferior in flame retardance. Comparative Example 6 is an example in which the addition amount of the component (D) of the present invention is large and outside the scope of the invention, and is inferior in flame retardance and impact resistance.

INDUSTRIAL APPLICABILITY

The flame retardant resin composition of the present invention has an excellent flame retardance and impact resistance, and is useful for various parts in the fields requiring high performances, including vehicles, electrics and electronics, communications, and OA and household appliances.

The invention claimed is:

1. A flame retardant resin composition comprising the following component (A), component (B), component (C) and component (D), in which 0.1 to 50 parts by mass of the component (B), 0.001 to 30 parts by mass of the component (C) and 0.1 to 50 parts by mass of the component (D) are blended with 100 parts by mass of the component (A)

Component (A): A rubber-modified styrene resin obtained by (co)polymerizing an aromatic vinyl compound or an aromatic vinyl compound and another vinyl monomer copolymerizable with the aromatic vinyl compound in a presence of a rubber-like polymer;

Component (B): A thermally expandable graphite;

Component (C): A layered clay material modified by a water-soluble polymer; and

Component (D): At least one selected from the group consisting of silicone compounds, boron oxides, aminotriazine sulfate compounds and aminotriazine compounds.

2. The flame retardant resin composition according to claim 1, further comprising 5 to 90% by mass of at least one component (E) selected from the group consisting of aromatic polycarbonates, polyarylene sulfides, polyamides, thermoplastic polyesters and phenolic resins based on 100% by mass of the total of the component (A) and the component (E).

3. The flame retardant resin composition according to claim 1, further comprising 0.1 to 30 parts by mass of an alkylene oxide adduct of a dihydroxyaryl compound (F) based on 100 parts by mass of the component (A) or the total of the component (A) and the component (E).

4. The flame retardant resin composition according to claim 1, further comprising 0.0001 to 20 parts by mass of a metal oxide and/or a metal salt of an inorganic acid (G) based on 100 parts by mass of the component (A) or the total of the component (A) and the component (E).

5. A molded article comprising a flame retardant resin composition according to claim 1.

6. The flame retardant resin composition according to claim 2, further comprising 0.1 to 30 parts by mass of an alkylene oxide adduct of a dihydroxyaryl compound (F) based on 100 parts by mass of the component (A) or the total of the component (A) and the component (E).

7. The flame retardant resin composition according to claim 6, further comprising 0.0001 to 20 parts by mass of a metal oxide and/or a metal salt of an inorganic acid (G) based on 100 parts by mass of the component (A) or the total of the component (A) and the component (E).

* * * * *